United States Patent
Zhang et al.

(10) Patent No.: US 10,521,432 B2
(45) Date of Patent: Dec. 31, 2019

(54) EFFICIENT EXECUTION OF DATA STREAM PROCESSING SYSTEMS ON MULTI-CORE PROCESSORS

(71) Applicant: SAP SE, Walldorf (DE)

(72) Inventors: Shuhao Zhang, Singapore (SG);
Bingsheng He, Singapore (SG); Daniel Hermann Richard Dahlmeier, Singapore (SG)

(73) Assignee: SAP SE, Walldorf (DE)

( * ) Notice: Subject to any disclaimer, the term of this patent is extended or adjusted under 35 U.S.C. 154(b) by 362 days.

(21) Appl. No.: 15/348,932

(22) Filed: Nov. 10, 2016

(65) Prior Publication Data

US 2018/0129713 A1 May 10, 2018

(51) Int. Cl.
*G06F 16/2455* (2019.01)
*G06F 16/901* (2019.01)

(52) U.S. Cl.
CPC .... *G06F 16/24568* (2019.01); *G06F 16/9024* (2019.01); *G06F 2212/2542* (2013.01)

(58) Field of Classification Search
CPC .................................................. G06F 16/9024
USPC ........................................................ 707/798
See application file for complete search history.

(56) References Cited

U.S. PATENT DOCUMENTS

| | | | | |
|---|---|---|---|---|
| 7,689,958 B1 * | 3/2010 | Ball | ..................... | G06F 17/5022 716/124 |
| 10,095,547 B1 * | 10/2018 | Kulkarni | ........... | G06F 16/24568 |
| 2003/0061395 A1 * | 3/2003 | Kingsbury | .............. | G06F 9/544 719/312 |
| 2004/0078524 A1 * | 4/2004 | Robinson | ............ | G06F 12/0813 711/133 |
| 2012/0317142 A1 * | 12/2012 | Broecheler | ......... | G06F 16/9024 707/770 |
| 2014/0101133 A1 * | 4/2014 | Carston | ............. | G06F 16/24545 707/718 |
| 2015/0149440 A1 * | 5/2015 | Bornea | ............. | G06F 16/24545 707/719 |
| 2015/0286748 A1 * | 10/2015 | Lilley | ..................... | G06F 16/28 707/794 |
| 2018/0114132 A1 * | 4/2018 | Chen | ................... | G06F 12/0875 |

OTHER PUBLICATIONS

Zhang K, Chen R, Chen H. NUMA-aware graph-structured analytics. ACM SIGPLAN Notices. Dec. 18, 2015;50(8):183-93. (Year: 2015).*

Anbar A, Serres O, Kayraklioglu E, Badawy AH, El-Ghazawi T. Exploiting hierarchical locality in deep parallel architectures. ACM Transactions on Architecture and Code Optimization (TACO). Jun. 27, 2016;13(2):16. (Year: 2016).*

(Continued)

*Primary Examiner* — Mohsen Almani
(74) *Attorney, Agent, or Firm* — Jones Day

(57) ABSTRACT

Described is a system, a method, and a computer-implemented apparatus for increasing computational efficiency and capacity of data stream processing systems. In one embodiment, executor grouping reduces cross-socket communication in a Non-Uniform Memory Access (NUMA) system. In another embodiment, input batching reduces thread context switches which improves instruction cache performance.

15 Claims, 3 Drawing Sheets

(56) References Cited

OTHER PUBLICATIONS

Jeannot E, Mercier G. Near-optimal placement of MPI processes on hierarchical NUMA architectures. InEuropean Conference on Parallel Processing Aug. 31, 2010 (pp. 199-210). Springer, Berlin, Heidelberg. (Year: 2010).*
Bahulkar K, Wang J, Abu-Ghazaleh N, Ponomarev D. Partitioning on dynamic behavior for parallel discrete event simulation. InProceedings of the 2012 ACM/IEEE/SCS 26th Workshop on Principles of Advanced and Distributed Simulation Jul. 15, 2012 (pp. 221-230). IEEE Computer Society. (Year: 2012).*
Frasca M, Madduri K, Raghavan P. NUMA-aware graph mining techniques for performance and energy efficiency. InProceedings of the International Conference on High Performance Computing, Networking, Storage and Analysis Nov. 10, 2012 (p. 95). IEEE Computer Society Press. (Year: 2012).*
Baer JL, Chen TF. An effective on-chip preloading scheme to reduce data access penalty. InSupercomputing'91: Proceedings of the 1991 ACM/IEEE Conference on Supercomputing Nov. 18, 1991 (pp. 176-186). IEEE. (Year: 1991).*
Roy A, Mihailovic I, Zwaenepoel W. X-stream: Edge-centric graph processing using streaming partitions. InProceedings of the Twenty-Fourth ACM Symposium on Operating Systems Principles Nov. 3, 2013 (pp. 472-488). ACM. (Year: 2013).*
Shun J, Blelloch GE. Ligra: a lightweight graph processing framework for shared memory. InACM Sigplan Notices Feb. 23, 2013 (vol. 48, No. 8, pp. 135-146). ACM. (Year: 2013).*
Xu J, Chen Z, Tang J, Su S. T-storm: Traffic-aware online scheduling in storm. In2014 IEEE 34th International Conference on Distributed Computing Systems Jun. 30, 2014 (pp. 535-544). IEEE. (Year: 2014).*
Li T, Tang J, Xu J. A predictive scheduling framework for fast and distributed stream data processing. In2015 IEEE International Conference on Big Data (Big Data) Oct. 29, 2015 (pp. 333-338). IEEE. (Year: 2015).*
Bedini I, Sakr S, Theeten B, Sala A, Cogan P. Modeling performance of a parallel streaming engine: bridging theory and costs. InProceedings of the 4th ACM/SPEC International Conference on Performance Engineering Apr. 21, 2013 (pp. 173-184). ACM. (Year: 2013).*
Chung YC, Ranka S. Applications and performance analysis of a compile-time optimization approach for list scheduling algorithms on distributed memory multiprocessors. InSuperconnputing'92: Proceedings of the 1992 ACM/IEEE Conference on Supercomputing Nov. 16, 1992 (pp. 512-521). IEEE. (Year: 1992).*
Gonzalez P, Bonacic C, Marin M. A Hybrid load-balancing solution for S4 stream processing systems. In2016 24th Euromicro International Conference on Parallel, Distributed, and Network-Based Processing (PDP) Feb. 17, 2016 (pp. 232-239). IEEE. (Year: 2016).*
Matei Zaharia et al., Discretized Streams: Fault-Tolerant Streaming Computation at Scale, SOSP '13 Proceedings of the Twenty-Fourth ACM Symposium on Operating Systems Principles, Nov. 2013, pp. 423-438, ACM, Farminton, Pennsylvania.
Leonardo Neumeyer et al., "S4: Distributed Stream Computing Platform", Data Mining Workshops (ICDMW), 2010 IEEE International Conference, Dec. 2010, IEEE, Sydney, Australia.
Jielong Xu et al., "T-Storm: Traffic-Aware Online Scheduling in Storm", 2014 IEEE 34th International Conference on Distributed Computing Systems, 2014, IEEE, Madrid, Spain.
Leonardo Aniello et al., "Adaptive Online Scheduling in Storm", DEBS '13 Proceedings of the 7th ACM International Conference on Distributed Event-based Systems, 2013, pp. 207-218, ACM, Arlington, USA.
Boyang Peng et al., "R-Storm: Resource-Aware Scheduling in Storm", Middleware '15 Proceedings of the 16th Annual Middleware Conference, Dec. 2015, pp. 149-161, ACM, Vancouver, Canada.
Viktor Leis et al., "Morsel-Driven Parallelism: A NUMA-Aware Query Evaluation Framework for the Many-Core Age", SIGMOD '14 Proceedings of the 2014 ACM SIGMOD International Conference on Management of Data, Jun. 2014, pp. 743-754, ACM, Snowbird, USA.
Yinan Li et al., "NUMA-aware Algorithms: The Case of Data Shuffling", CIDR 2013, Sixth Biennial Conference on Innovative Data Systems Research, Jan. 2013, Asilomar, USA.
SGI, "SGI® UV™ 300H System Specifications", "sgi.com/uv", retrieved online Jun. 10, 2016, Silicon Graphics International Corp.
Jim Gray, "Database and Transaction Processing Performance Handbook", The Benchmark Handbook for Database and Transaction Systems (2nd Edition), 1993, Morgan Kaufmann Publishers Inc.
Ahsan Javed Awan et al., "Performance Characterization of In-Memory Data Analytics on a Modem Cloud Server", Big Data and Cloud Computing (BDCloud), 2015 IEEE Fifth International Conference, Jun. 2015, IEEE, Dalian, China.
Shriram Sridharan et al., "Profiling R on a Contemporary Processor", Proceedings of the VLDB Endowment, Oct. 2014, pp. 173-184, vol. 8 No. 2.
Samuel Madden, "Intel Lab Data", "http://db.csail.mit.edu/labdata/labdata.html", retrieved online on Sep. 26, 2016.
Performance Inspector, "Performance Inspector™", "http://perfinsp.sourceforge.net/", retrieved online on Sep. 26, 2016.
Neil Coffey, "Classmexer Agent", "http://www.javamex.com/classmexer/", retrieved online on Aug. 30, 2016.
Intel, "Intel® VTune™ Amplifier 2017", "https://software.intel.com/en-us/intel-vtune-amplifier-xe", retrieved online on Sep. 26, 2016.
Mawazo, "Real Time Fraud Detection with Sequence Mining", "https://pkghosh.wordpress.com/2013/10/21/real-time-fraud-detection-with-sequence-mining/", retrieved online on Sep. 26, 2016.
WORLDCUP98, "1998 World Cup Web Site Access Logs", "http://ita.ee.lbl.gov/html/contrib/WorldCup.html", retrieved online on Sep. 26, 2016.
Jingren Zhou et al., "Buffering Database Operations for Enhanced Instruction Cache Performance", SIGMOD '04 Proceedings of the 2004 ACM SIGMOD International Conference on Management of Data, Jun. 2004, pp. 191-202, ACM, Paris, France.
Stavros Harizopoulos et al., "Improving Instruction Cache Performance in OLTP", ACM Transactions on Database Systems (TODS), Sep. 2006, pp. 887-920, vol. 31 No. 3, ACM.
Anastassia Ailamaki et al., "DBMSs on a Modern Processor: Where Does Time Go?", VLDB '99 Proceedings of the 25th International Conference on Very Large Data Bases, Sep. 1999, pp. 266-277, Morgan Kaufmann Publishers Inc.
Ambuj Shatdal et al., Cache Conscious Algorithms for Relational Query Processing, VLDB '94 Proceedings of the 20th International Conference on Very Large Data Bases, Sep. 1994, pp. 510-521, Morgan Kaufmann Publishers Inc.
Peter Boncz et al., "Database Architecture Optimized for the New Bottleneck: Memory Access", VLDB '99 Proceedings of the 25th International Conference on Very Large Data Bases, Sep. 1999, pp. 54-65, Morgan Kaufmann Publishers Inc., Edinburgh, Scotland.
Cagri Balkesen et al., "Main-Memory Hash Joins on Multi-Core CPUs: Tuning to the Underlying Hardware", ICDE 13 Proceedings of the 2013 IEEE International Conference on Data Engineering, Apr. 2013, pp. 362-373, IEEE Computer Society.
Jana Giceva et al., "Deployment of Query Plans on Multicores", Proceedings of the VLDB Endowment, Nov. 2014, pp. 233-244, vol. 8 No. 3, VLDB Endowment.
Stavros Harizopoulos et al., "A Case for Staged Database Systems", Proceedings of the CIDR Conference, 2003.
Giuseppe Bianchi et al., "On-demand Time-decaying Bloom Filters for Telemarketer Detection", ACM SIGCOMM Computer Communication Review, Oct. 2011, pp. 6-12, Sep. 2011, vol. 41 No. 5, ACM.
Yu Zheng et al., "Mining Interesting Locations and Travel Sequences from GPS Trajectories", WWW '09 Proceedings of the 18th International Conference on World Wide Web, Apr. 2009, pp. 791-800, ACM, Madrid, Spain.
Arvind Arasu et al., "Linear Road: A Stream Data Management Benchmark", VLDB '04 Proceedings of the Thirtieth International Conference on Very Large Data Bases, 2004, pp. 480-491, vol. 30, VLDB Endowment, Toronto, Canada.

(56) References Cited

OTHER PUBLICATIONS

Daniel J. Abadi et al., "Aurora: A New Model and Architecture for Data Stream Management", The VLDB Journal—The International Journal on Very Large Data Bases, Aug. 2003, pp. 120-139, vol. 12 No. 2, Springer-Verlag.

Daniel J. Abadi et al., "The Design of the Borealis Stream Processing Engine", Proceedings of the CIDR Conference, 2005.

Navendu Jain et al., "Design, Implementation, and Evaluation of the Linear Road Benchmark on the Stream Processing Core", SIGMOD '06 Proceedings of the 2006 ACM SIGMOD International Conference on Management of Data, Jun. 2006, pp. 431-442, ACM, Chicago, USA.

Matthias J. Sax et al., "Building a Transparent Batching Layer for Storm", Technical Report, Jul. 2014, Hewlett-Packard Development Company, L.P.

Tore Risch et al., "Uppala University Linear Road Implementations", "http://www.it.uu.se/research/group/udbl/lr.html", retrieved online on Sep. 26, 2016.

David Detlefs et al., "Garbage-First Garbage Collection", ISMM '04 Proceedings of the 4th International Symposium on Memory Management, Oct. 2004, pp. 37-48, ACM, Vancouver, Canada.

Olivier Goldschmidt et al., "A Polynomial Algorithm for the k-cut Problem for Fixed k", Mathematics of Operations Research, Feb. 1994, pp. 24-37, vol. 19 No. 1, INFORMS Institute for Operations Research and the Management Sciences, Maryland, USA.

Sirish Chandrasekaran et al., "TelegraphCQ: Continuous Dataflow Processing for an Uncertain World+", Proceedings of the CIDR Conference, 2003.

Yahoo, "Benchmarking Streaming Computation Engines at Yahoo!", "https://yahooeng.tumblr.com/post/135321837876/benchmarking-streaming-computation-engines-at", retrieved online on Sep. 26, 2016.

Marcelo R. N. Mendes, "Performance Evaluation and Benchmarking of Event Processing Systems", Sep. 2013.

Jagmohan Chauhan et al., "Performance Evaluation of Yahoo! S4: A First Look", P2P, Parallel, Grid, Cloud and Internet Computing (3PGCIC), Seventh International Conference, Nov. 2012, IEEE, Victoria, Canada.

Kian-Lee Tan et al., "In-memory Databases—Challenges and Opportunities", ACM SIGMOD Record, Jun. 2015, pp. 35-40, vol. 44 No. 2, ACM.

Hao Zhang et al., "In-Memory Big Data Management and Processing: A Survey", IEEE Transactions on Knowledge and Data Engineering, Jul. 2015, pp. 1920-1948, vol. 27 No. 7, IEEE.

\* cited by examiner

EFFICIENT EXECUTION OF DATA STREAM PROCESSING SYSTEMS ON MULTI-CORE PROCESSORS

BACKGROUND

Distributed computing is becoming more popular. Data stream processing systems, such as Apache Storm™, Flink, Spark Streaming, Samza, and S4, have been created to take advantage of distributed computing environments, such as cloud computing systems, enabling increased processing capacity by "scaling out". Data stream processing systems are used to perform realtime processing such as analytics, online machine learning, continuous computation, and other processor intensive yet latency sensitive computing tasks. However, when scaling up, by running a data stream processing system on a modern, multi-core processor, front-end stalls, particularly instruction cache misses and instruction queue full stalls, are major bottlenecks, which lead to significantly slower execution times. Furthermore, costly memory accesses across Central Processing Unit (CPU) sockets also limit the scalability of such data stream processing systems on multi-socket and/or multi-core processors.

Therefore, there is a need for an improved framework that addresses the above mentioned challenges.

SUMMARY

Described is a system, a method, and a computer-implemented apparatus for increasing computational efficiency and capacity of data stream processing systems. Modern out-of-order CPU cores have very complicated instruction execution pipelines, as well as a deep cache hierarchy. On parallel architectures, processing executed by a data stream processing system must be spread evenly among many threads in order to achieve scalability.

As modern machines scale to multiple sockets, non-uniform memory access (NUMA) becomes another important dimension for the performance on multi-socket systems. It is understood that throughout this disclosure, the term core which refers to a single CPU core on a multi-core machine, and the term socket which refers to one or a plurality of processors operating on a multi-processor machine are used interchangeably. With NUMA, data access performance depends on the location of the processor of the data and the accessing thread. NUMA is a bottleneck issue when running data stream processing systems on multiple CPU sockets. For example, experiments show that the performance on four CPU sockets is even lower than that on a single socket. Costly memory accesses across sockets severely limit the scalability of data stream processing systems on multi-core processors. In some scenarios, memory stalls from remote memory accesses can stall up to 70% of threads when running data stream processing systems on four CPU cores/sockets.

Furthermore, experiments show that on a single CPU socket more than 50% of the total execution time is spent in stalls. Surprisingly, nearly 40% of the total execution time is spent in front-end stalls even for compute and memory intensive workloads, and goes up to 60% in other workloads. The major contribution to front-end stalls is instruction cache misses. The frequent context switching and the large instruction footprint of data stream processing system executor threads are the main causes of the high instruction cache misses. In addition to front-end stalls, another relatively significant factor is Translation Lookaside Buffer (TLB) stalls.

In one embodiment, these challenges and others are addressed by executor grouping, which reduces cross-socket communication in a NUMA system. In another embodiment, these and other challenges are addressed by input batching, which reduces thread context switches, improving instruction cache performance. In yet another embodiment, these and other challenges are addressed by increasing TLB page size.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
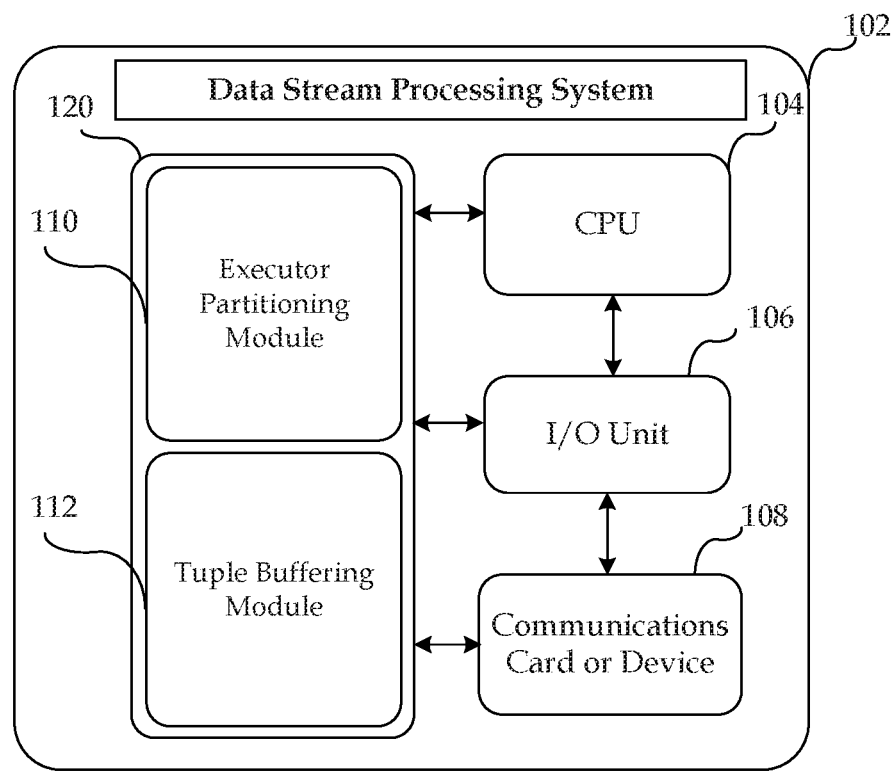
FIG. 1 is a block diagram illustrating an exemplary architecture.

FIG. 1 is a block diagram illustrating an exemplary architecture 100 that may be used to implement ranking items, as described herein. Generally, architecture 100 may include a data stream processing system 102.

The data stream processing system 102 can be any types of computing device that are capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include executor partitioning module 110 and tuple buffering module 112.

Executor partitioning module 110 includes logic for receiving a data stream processing system topology. In one embodiment, the topology is defined as a directed acyclic graph (DAG) with vertices representing spouts or executors, and edges representing communication links between the spouts or executors. In a data stream processing system, spouts generate input events to feed into the topology. Executors (also known as bolts) are nodes of the system that perform the computation which, based on the topography, output computation results to other executors or return a final computation result to the invoker of the computation. In some data stream processing systems, such as Apache Storm™, executors are single threads of execution, typically operate on a cloud or other distributed hardware environment.

Data stream processing systems are designed to handle massive data parallelism. Both pipeline and parallel execution models are supported. The parallelism of an operator can be scaled by launching multiple instances of its execution in parallel. Input events, originating from spouts, are shared among these executors. Executors operate independently and exchange data, e.g., a tuple, asynchronously in a pipelined manner. Tuple transmission between executors are governed by a transmission rule, such as broadcast (all executors receive the tuple); group-by (tuples are distributed to particular executors based on the value of a field in one of the tuples); and shuffle grouping (random distribution of tuples to executors).

Executor partitioning module 110 partitions the executors into disjoint sets for execution on a multi-core or a multi-processor computer, such as a computer with a Non-Uniform Memory Access (NUMA) architecture. Executor partitioning module 110 balances memory access wait times across different cores or processors, which increases with the use of additional processors, with parallelism, which also increases with additional processors. Once the executors have been partitioned, the executors are pinned to a core or processor based on the result of the partitioning.

Tuple buffering module 112 includes logic for partitioning a plurality of input tuples into batches and transmitting the batches to executors for processing. This way, destination consumers of each executor can process multiple tuples in one thread invocation, which leads to less frequent thread context switching. In comparison, traditional data stream processing systems, such as Apache Storm™, distribute input tuples individually. This causes executor nodes to experience instruction cache misses, instruction queue stalls, and decoded instruction cache switch problems. Many of these effects are caused by excessive thread context switching when a given node processes different tasks which overwhelms the queue/cache capacities.

Figure 2:
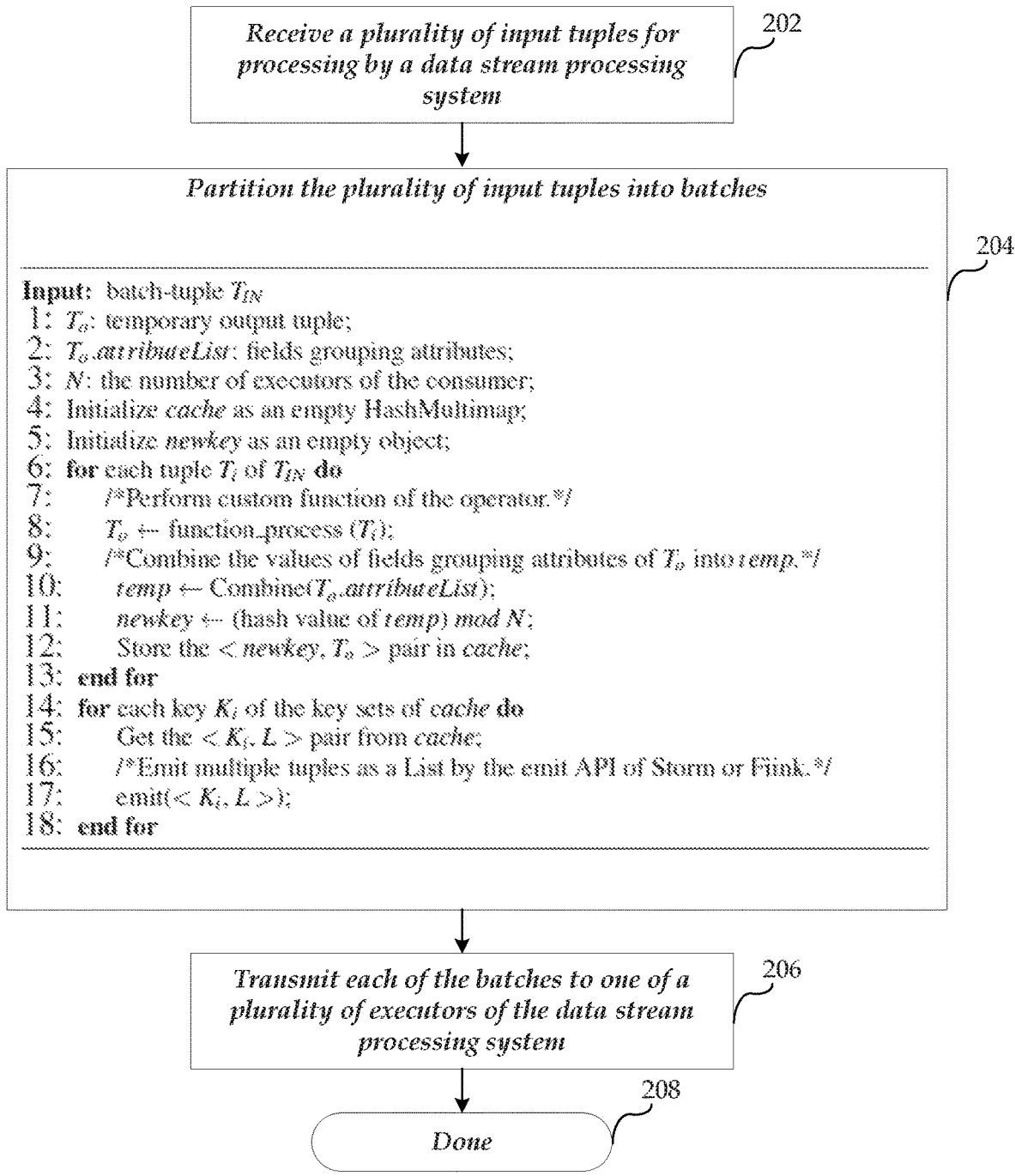
FIG. 2 is a flow chart illustrating one embodiment of input batching in a data stream processing system.

FIG. 2 is a flow chart 200 illustrating one embodiment of input batching in a data stream processing system. At block 202, a plurality of input tuples are received for processing by a data stream processing system. While tuples are used to represent input throughout this disclosure, other types of input are similarly contemplated, for example, sets, arrays, objects, single values, or the like.

In one embodiment, input tuples are received from a tuple source, e.g. a "spout". However, in another embodiment, the tuples to be batched are the output tuples of an executor node, and it is that executor node that performs the batching. In this embodiment, tuple batching is achieved without an intermediate buffering stage, as the set of tuples from which to create one or more batches is known by the executor node that generated it. Specifically, the executor node takes output tuples from one operation, and batches them according to a topology distribution mechanism, as described below with regard to block 204. This embodiment avoids delays caused by waiting an indeterminate amount of time for a buffer to fill before distributing tuple batches.

At block 204, the plurality of input tuples are partitioned into one or more batches. In one embodiment, batching is performed based on the topology or distribution mechanism of the data stream processing system. For example, when executor nodes are selected randomly for input tuple distribution (i.e., shuffle grouping), tuples are randomly batched into groups of a defined number (e.g., 2, 4, 7, 19, 101, or any other number) and are distributed to individual executors. This way, multiple invocations of the executors occur on the same thread invocation; reducing thread context switching.

However, when the executor nodes are not selected at random, but for example are selected based on one or more of the fields of the input tuple (i.e., fields grouping), batches of input tuples are created using a multi-value hash map, in which the field upon which executor grouping is based is the key of the multi-value hash map. One embodiment of an algorithm for tuple batching for fields grouping is listed in block 204 of FIG. 2. The algorithm process is further described below.

A plurality of tuples (i.e., a batch-tuple) $T_{IN}$, is received as an input. At line 1, $T_O$, a temporary output tuple, is defined while at line 2 $T_O$.attributeList defines a list of fields grouping attributes associated with the temporary output tuple. Line 3 defines N, the number of executors. At line 4, a new multi-value hash map (e.g., a Java™ HashMultimap) cache is initialized, while at line 5 newkey is initialized as an empty object.

Lines 6-13 iterate over each tuple $T_i$ of $T_{IN}$. At line 7, a custom function is performed on $T_i$, the result being stored in the temporary output tuple $T_O$. At line 9, the values of the fields grouping attributes of $T_O$.attributeList are passed to a Combine function, the result of which is stored in a temp variable. Combining fields into a single value provides a robust and consistent way to ensure tuples that are field-grouped based on multiple fields are distributed to the same executor. At line 11, a hash value of the temp variable is computed, and after performing a modulo (N) operation, the result is stored as newkey. At line 12, the pair <newkey, $T_O$> is stored in cache (the multi-value hash map). Multiple tuples $T_O$ having the same key will be stored in the same set of the multi-value hash map.

Lines 14-18 iterate over each key $K_i$ of the key sets of cache. At line 15, the pair<$K_i$, L> is retrieved from cache, where $K_i$ is one of the keys calculated in line 11, and L is a corresponding list of tuples. Then, at line 17, each of the tuples in list L is emitted to the data stream processing system.

At block 206, the batches are transmitted to executors for processing. By executing the batch of tuples on a single thread invocation, instruction cache effectiveness is increased, instruction queue stalling is prevented, and the like.

At block 208, the process 200 ends.

Figure 3:
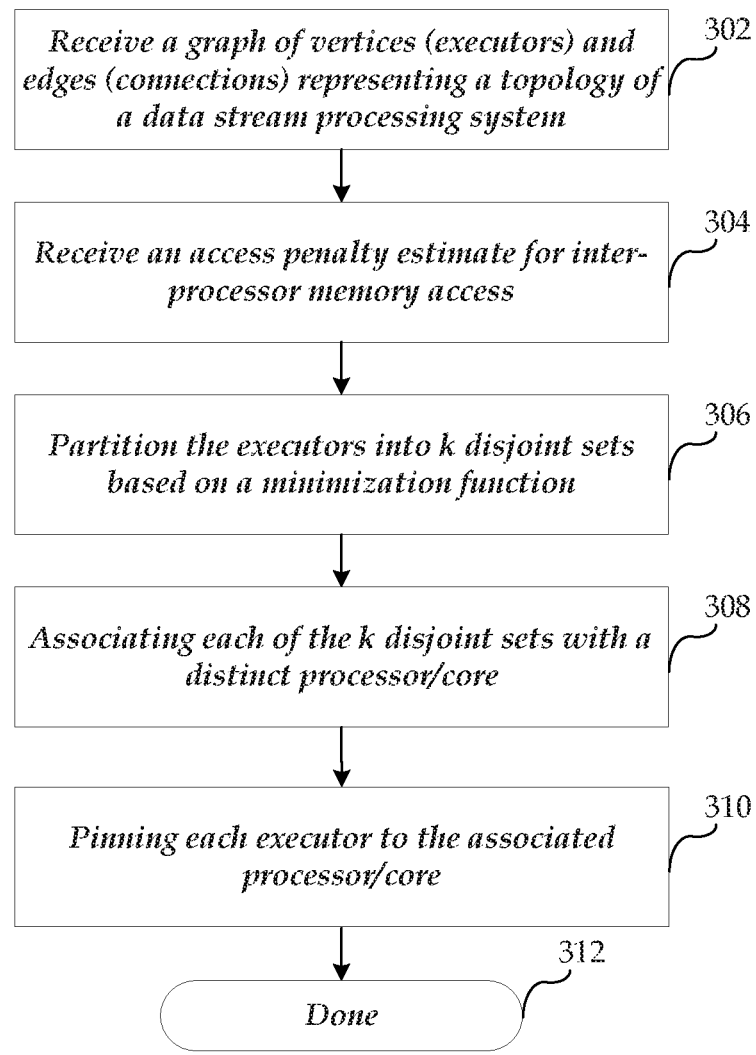
FIG. 3 is a flow chart illustrating one embodiment of partitioning executors in a data stream processing system.

FIG. 3 is a flow chart 300 illustrating one embodiment of executor pinning in a data stream processing system. At block 302, a graph with vertices (V) representing executors and edges (E) representing communication links between the executors is received. V and E define a topology of a data stream processing system. In one embodiment, executors fetch (or receive) input tuples for processing and emit output tuples as processing results. The input of one executor may be the output of another; enabling a chain of executors to operate on data.

At block 304, a memory access penalty estimate (P) is received. P estimates the cost to memory access from a first executor on a first core or processor to memory associated with another core/processor. For example, in a NUMA architecture, memory associated with a processor may have a low latency, while memory associated with other processors may have a high latency. Memory associated with non-adjacent processors may have even higher latencies.

At block 306, the executors represented by vertices (V) are partitioned into k disjoint sets ($C_1, C_2, \ldots, C_k$) based on minimizing $\Sigma_{i=1}^{k-1}\Sigma_{j=i+1}^{k}\Sigma W_{ij}$. In one embodiment, $W_{ij}=P*T_{ij}$ if $V_i$ and $V_j$ are in different sets and $W_{ij}=0$ otherwise. In one embodiment, $T_{ij}$=a total number of output tuples emitted and input tuples fetched on $E_{ij}$, where $E_{ij}$ represents an edge between $V_i$ and $V_j$.

In one embodiment, $\Sigma_{i=1}^{k-1}\Sigma_{j=i+1}^{k}\Sigma W_{ij}$ is minimized using a polynomial algorithm. In one embodiment, $\Sigma_{i=1}^{k-1}\Sigma_{j=i+1}^{k}\Sigma W_{ij}$ is minimized by iteratively setting k to a distinct integer (e.g., 2, 3, 4, . . . ) and then empirically evaluating which configuration processes the input tuples most effectively. In this way, over different numbers of cores/processors can be evaluated (where k=number of cores/processors).

In one embodiment, batching is performed based on the topology or distribution mechanism of the data stream processing system. For example, when executor nodes are selected randomly for input tuple distribution, input tuple batching is enabled. However, when executor nodes are not selected at random, but for example are selected based on one of the fields of the input tuple, input tuple batching is disabled to avoid error grouping.

At block 308, each of the k disjoint sets is associated with a core/processor. In one embodiment, the association is a random mapping.

At block 310, each executor is pinned to the core or processor associated with the set it was partitioned into.

At block 312, the process 300 ends.

The invention claimed is:

1. A computer-implemented method for increasing computational efficiency and capacity of data stream processing systems, the method comprising:
   receiving a graph with vertices (V) representing executors and edges (E) representing communication links between the executors, wherein
      the vertices and edges define a topology of a data stream processing system, and
      the executors fetch input tuples for processing and emit output tuples as processing results;
   receiving an access penalty estimate (P) for inter-processor memory access that is pre-defined and estimates a cost to memory access from a first executor on a first processor to memory associated with a second processor within the data stream processing system;
   partitioning the executors into k disjoint sets based on a function that uses the access penalty estimate, the function balancing memory access wait times across different processors which increases with the use of additional processors, with parallelism which increases with additional processors;
   associating each of the k disjoint sets with a distinct processor of the data stream processing system;
   for each of the k disjoint sets, pinning each executor to the associated distinct processor of the data stream processing system;
   batching the input tuples, wherein the input tuples include a set of output tuples generated by one of the executors; and
   distributing a batch of the input tuples to an executor.

2. The computer-implemented method of claim 1, wherein each distinct processor is one of a plurality of processors having a Non-Uniform Memory Access (NUMA) architecture.

3. The computer-implemented method of claim 1, wherein the data stream processing system comprises an Apache Storm™ deployment.

4. The computer-implemented method of claim 1 further comprising increasing a Transition Lookaside Buffer (TLB) page size.

5. The method of claim 1, wherein the input tuples are batched when the input tuples are distributed randomly to the corresponding executor, and wherein the input tuples are not batched when the input tuples are distributed to the corresponding executor based on a tuple field.

6. The method of claim 1, wherein the input tuples are batched and distributed based on a hash of one of tuple fields of the input tuple.

7. A computing apparatus for increasing computational efficiency and capacity of data stream processing comprising:
   a processor; and
   a memory storing instructions that, when executed by the processor, configures the apparatus to:
      receive a graph with vertices (V) representing executors and edges (E) representing communication links between the executors, wherein
         the vertices and edges define a topology of a data stream processing system, and
         the executors fetch input tuples for processing and emit output tuples as processing results,
      receive an access penalty estimate (P) for inter-processor memory access that is pre-defined and estimates a cost to memory access from a first executor on a first processor to memory associated with a second processor within the data stream processing system;
      partition the executors into k disjoint sets based on a function that uses the access penalty estimate, the function balancing memory access wait times across different processors which increases with the use of additional processors, with parallelism which increases with additional processors;
      associate each of the k disjoint sets with a distinct processor of the data stream processing system;
      for each of the k disjoint sets, pin each executor to the associated distinct processor of the data stream processing system;
      batch the input tuples, wherein the input tuples include a set of output tuples generated by one of the executors; and
      distribute a batch of the input tuples to an executor.

8. The computing apparatus of claim 7, wherein each distinct processor is one of a plurality of processors having a Non-Uniform Memory Access (NUMA) architecture.

9. The computing apparatus of claim 7, wherein the input tuples are batched when the input tuples are distributed randomly to the executor, and wherein the input tuples are not batched when the input tuples are distributed to the executor based on a tuple field.

10. The computing apparatus of claim 7, wherein the input tuples are batched and distributed based on a hash of one of tuple fields of the input tuple.

11. A non-transitory computer-readable storage medium for increasing computational efficiency and capacity of data stream processing, the computer-readable storage medium including instructions that when executed by a computer, cause the computer to:

receive a graph with vertices (V) representing executors and edges (E) representing communication links between the executors, wherein
the vertices and edges define a topology of a data stream processing system, and
the executors fetch input tuples for processing and emit output tuples as processing results;

receive an access penalty estimate (P) for inter-processor memory access that is pre-defined and estimates a cost to memory access from a first executor on a first processor to memory associated with a second processor within the data stream processing system;

partition the executors into k disjoint sets based on a function that uses the access penalty estimate, the function balancing memory access wait times across different processors which increases with the use of additional processors, with parallelism which increases with additional processors;

associate each of the k disjoint sets with a distinct processor of the data stream processing system;

for each of the k disjoint sets, pinn each executor to the associated distinct processor of the data stream processing system;

batch the input tuples, wherein the input tuples include a set of output tuples generated by one of the executors; and distribute a batch of the input tuples to an executor.

12. The non-transitory computer-readable storage medium of claim 11, wherein each distinct processor is one of a plurality of processors having a Non-Uniform Memory Access (NUMA) architecture.

13. The non-transitory computer-readable storage medium of claim 11, wherein the data stream processing system comprises an Apache Storm™ deployment.

14. The non-transitory computer-readable storage medium of claim 11, wherein the input tuples are batched and distributed based on a hash of one of tuple fields of the input tuple.

15. The non-transitory computer-readable storage medium of claim 11, wherein the input tuples are batched when the input tuples are distributed randomly to the corresponding executor, and wherein the input tuples are not batched when the input tuples are distributed to the corresponding executor based on a tuple field.

* * * * *